July 11, 1933.   N. A. CHRISTENSEN   1,917,429
COMPRESSOR DRIVE APPARATUS
Filed March 15, 1929   2 Sheets-Sheet 2

Patented July 11, 1933

1,917,429

UNITED STATES PATENT OFFICE

NIELS A. CHRISTENSEN, OF CLEVELAND, OHIO

COMPRESSOR DRIVE APPARATUS

Application filed March 15, 1929. Serial No. 347,220.

The invention relates to automotive compressors.

In several prior United States Letters Patents I have shown and described a compressor drive arrangement wherein the compressor is driven off the front end of the crank shaft and is associated with the front end plate. In certain designs of automotive engines this type of drive cannot be readily incorporated and it is the object of this invention to provide a drive for the compressor that may be readily incorporated in automotive power plants of existing design with little change in the motor. More particularly, according to the present invention the compressor is driven from the intermediate portion of the crank shaft of a multi-cylinder engine by forming the compressor drive member as a part of the crank shaft between one of the crank throws and one of the intermediate bearing portions preferably the center bearing portion of said shaft and mounting the compressor cylinder on the engine crankcase at an angle to the power cylinders.

The invention further consists in the several features hereinafter set forth and more particularly defined by claims at the conclusion hereof.

In the drawings Fig. 1 is a side elevation view of apparatus embodying the invention, parts of the auxiliary equipment of the engine being omitted.

Figure 1:
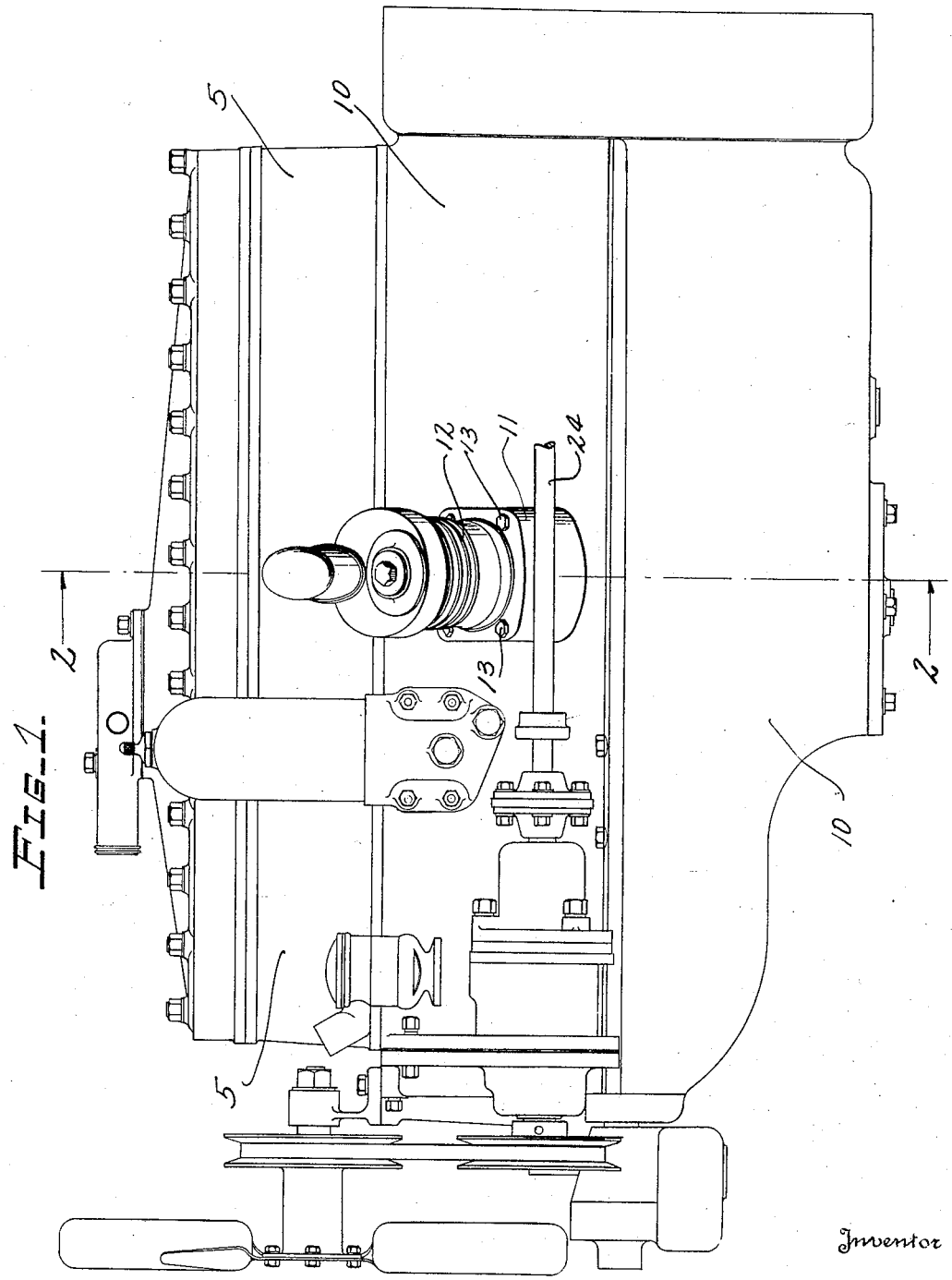
Figure 2:
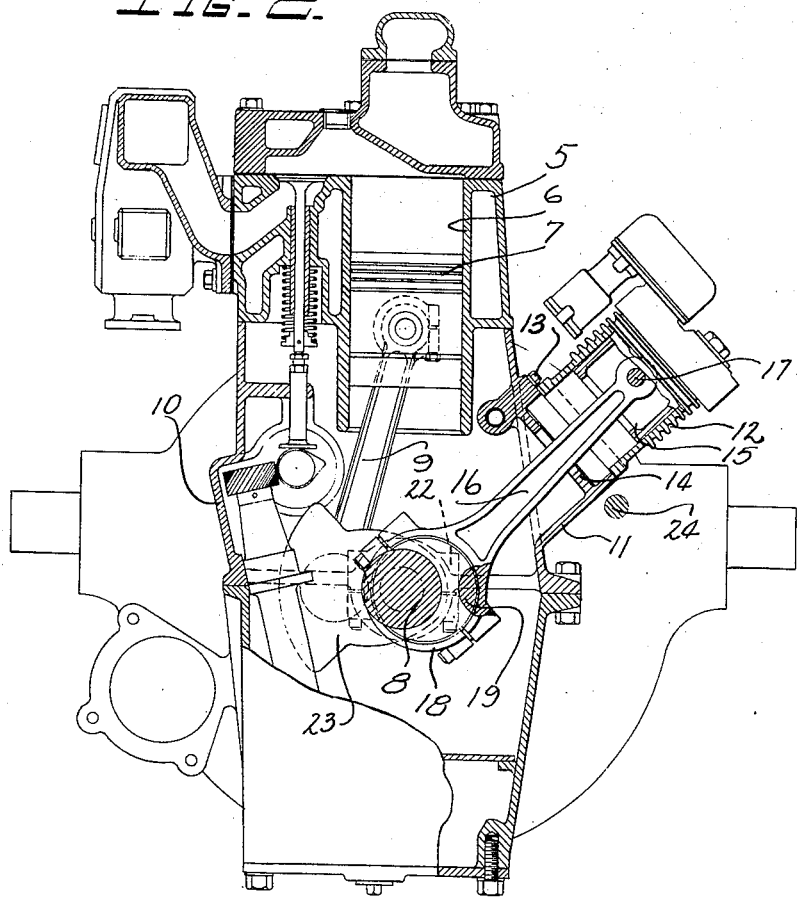
Fig. 2 is a detail sectional view taken on the line 2—2 of Fig. 1, parts being shown in full.
Figure 3:
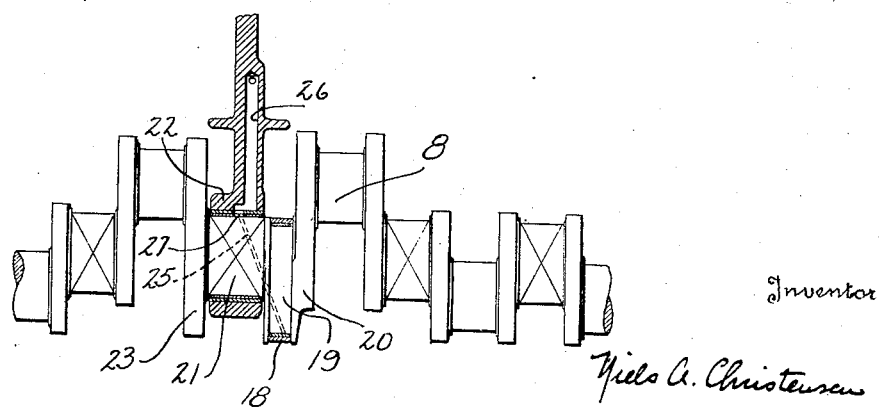
Fig. 3 is a detail view of a portion of the crank shaft with parts associated therewith in vertical section.

Referring to the drawings the numeral 5 designates generally a multicylinder, automotive type, internal combustion engine, 6 one of the power cylinders, 7 the piston working therein, 8 the crank shaft, 9 the rod connecting said shaft to the piston in the usual manner, and 10 the crankcase of the engine.

According to the present invention there is formed integral with the crankcase 10, or connected thereto and extending at an angle, a compressor cylinder support 11 upon which the compressor cylinder 12 is mounted and secured thereto by bolts 13, said support having an opening 14 extending therethrough whereby the cylinder of said compressor freely communicates with the crank case of the engine and the compressor drive parts are also free to reciprocate.

A piston 15 works in the compressor cylinder and is connected to one of the connecting-rods 16 in the usual manner by the wristpin 17. The adjustable big end bearing 18 of the compressor connecting-rod 16 is mounted on an eccentric 19 formed on the crank shaft 8 between one of the intermediate cranks 20 and the central bearing portion 21 of the crank shaft 8, which is mounted in the central bearing 22 provided on the crankcase of the engine.

The eccentric and other rotating parts are balanced by a counterweight 23 formed on one of the crank cheeks of the crank throw on the opposite side of the bearing 22 from that of the eccentric.

The compressor is equipped with the usual inlet and discharge valves and as the engine crank shaft rotates the compressor piston is reciprocated thereby to accomplish its work. The compressor as mounted does not interfere with the drive of the lay shaft 24 for the auxiliary equipment of the engine.

With this arrangement the substitution of a new crank shaft, the reduction in width of the central bearing and the provision of the cylinder support are the only changes necessary to adapt the compressor to known designs and when so altered the compressor is efficiently driven from the engine.

The crank shaft preferably has a drilled passage 25 therein connecting the pressure oil supply duct 26 through opening 27 in the bearing 22 with the outer portion of the eccentric so as to oil the big end bearing of the connecting-rod.

I desire it to be understood that this invention is not to be limited to any particular form or arrangement of parts except insofar as such limitations are included in the claims.

What I claim as my invention is:

1. In an automotive engine, the combination with the engine crankcase and cylinders, of an engine crank shaft having diametrically disposed counterweights and an eccentric formed thereon between one of the intermediate bearing portions and an adjacent crank, said eccentric being disposed diametrically with respect to said adjacent crank, a compressor cylinder mounted on the engine at an angle to the engine cylinders and freely communicating with the crankcase of the engine, a piston working in said cylinder, and means including a connecting-rod operatively connecting said piston with said eccentric.

2. In an automotive engine, the combination with the engine crankcase and cylinders, of an engine crank shaft having cranks and diametrically disposed counterweights, a bearing for intermediate cranks of said shaft and disposed adjacent one of said cranks, said crank shaft having an eccentric formed thereon adjacent the other of said intermediate cranks and diametrically disposed with respect thereto, said eccentric being positioned between said crank and said bearing whereby the one bearing takes the strains of both of said intermediate cranks and said eccentric, a compressor cylinder mounted on the engine at an angle to the engine cylinders and freely communicating with the crankcase of the engine, a piston working in said cylinder, and means including a connecting-rod operatively connecting said piston with said eccentric.

In testimony whereof, I affix my signature.

NIELS A. CHRISTENSEN.